(12) United States Patent
Lin (10) Patent No.: US 9,163,353 B2
(45) Date of Patent: Oct. 20, 2015

(54) METHOD AND APPARATUS FOR CUTTING AND SEALING (71) Applicant: Michael Lin, Buffalo, NY (US)

(72) Inventor: Michael Lin, Buffalo, NY (US)

(*) Notice: Subject to any disclaimer, the term of this patent is extended or adjusted under 35 U.S.C. 154(b) by 39 days.

(21) Appl. No.: 13/926,287

(22) Filed: Jun. 25, 2013

(65) Prior Publication Data

US 2014/0374002 A1    Dec. 25, 2014

(51) Int. Cl.
*B32B 37/06*  (2006.01)
*B32B 38/04*  (2006.01)
(Continued)

(52) U.S. Cl.
CPC .. *D06H 7/00* (2013.01); *B26D 1/14* (2013.01); *B26D 7/086* (2013.01); *B26D 7/27* (2013.01);
(Continued)

(58) Field of Classification Search
CPC ........... B25F 1/00; B25F 3/00; B29C 65/103; B29C 65/7439; B29C 65/7459; B29C 66/83; B29C 65/00; B29C 65/74; B29C 65/002; B29C 65/741; B29C 65/743; B29C 65/7471; B29C 65/749; B29C 65/02; B29C 65/745; B29C 66/0326; B29C 66/03; B29C 66/836; B29C 66/8362; B29C 66/032; B29C 40/472; B29C 70/729; B29L 2007/002; B29D 1/0006; B29D 1/01; Y10T 156/18; Y10T 156/1052; Y10T 165/1084; Y10T 156/12; Y10T 156/1365; Y10T 156/1348; Y10T 156/1374; Y10T 156/1378; D06H 7/005; D06H 7/06; D06H 7/00; D06H 7/02; D06H 7/04; D06H 7/223; D06H 5/00; D03D 5/00; B26D 2001/004; B26D 2001/0046; B26D 7/27; B26D 7/0068; B26D 7/26; B26D 7/2614; B26D 7/2621; B26D 2007/72657; B26D 1/56; B26D 1/565; B26D 1/58; B26D 1/585; B26D 1/60; B26D 1/605; B26D 1/62; B26D 1/623; B32B 37/06; B32B 38/0004; B32B 2038/045
USPC .......... 156/88, 73.3, 256, 259, 267, 269, 270, 156/271, 308.2, 308.4, 574, 579, 497, 499, 156/511, 523, 275.1
See application file for complete search history.

(56) References Cited

U.S. PATENT DOCUMENTS 3,076,252 A * 2/1963 Hofmann .......................... 156/88
4,858,416 A * 8/1989 Monaghan ....................... 53/439
(Continued)

FOREIGN PATENT DOCUMENTS

DE    2634405    *  2/1978 ............. A41D 27/24

OTHER PUBLICATIONS

Machine Translation (i.e., "mac trans") of DE2634405(A1) published Feb. 2, 1978, 11 pages.*

*Primary Examiner* — Linda L Gray
(74) *Attorney, Agent, or Firm* — Vincent G. LoTempio; Kloss, Stenger & LoTempio; David T. Stephenson (57) ABSTRACT

A method and apparatus for cutting and sealing a moving length of a fabric by heating, sealing, and finally cutting the fabric in a linear process to form an even, fused edge. The fabric undergoes a sequence of manipulations efficacious for cutting and sealing the fabric to a desired pattern and edge width. The method and apparatus help to minimize frayed edges on the fabric by bonding and fusing the fibers prior to cutting. The fabric is initially drawn through the apparatus in a predetermined pattern, such as a window blind. A heating portion directs a hot gas onto a section of the fiber desired for creating the edges. The heated section is compressed under a seal, which helps fuse perpendicular and parallel cross sections of fibers. The newly sealed section is then immediately cut with a cutting portion to form at least one fused edge.

18 Claims, 5 Drawing Sheets

(51) Int. Cl.
   *D06H 7/00* (2006.01)
   *B26D 7/27* (2006.01)
   *B26D 1/14* (2006.01)
   *B26D 7/08* (2006.01)
   *B62D 7/10* (2006.01)
   *B32B 38/00* (2006.01)

(52) U.S. Cl.
   CPC . *B62D 7/10* (2013.01); *B32B 37/06* (2013.01); *B32B 38/0004* (2013.01); *Y10T 156/1052* (2015.01); *Y10T 156/12* (2015.01); *Y10T 156/125* (2015.01)

(56) References Cited

U.S. PATENT DOCUMENTS

| | | | |
|---|---|---|---|
| 5,503,705 A * | 4/1996 | Rohleder et al. | 156/494 |
| 5,656,111 A * | 8/1997 | Dilnik et al. | 156/66 |
| 5,804,512 A * | 9/1998 | Lickfield et al. | 442/346 |
| 5,932,041 A | 8/1999 | Dolling et al. | |
| 6,236,030 B1 | 5/2001 | Neumann | |
| 6,471,803 B1 | 10/2002 | Pelland et al. | |
| 7,615,128 B2 | 11/2009 | Mikkelsen | |

* cited by examiner

METHOD AND APPARATUS FOR CUTTING AND SEALING

FIELD OF THE INVENTION

The present invention relates generally to a method and apparatus for cutting and sealing. More so, the method and apparatus for cutting and sealing cuts and seals a moving length of a fabric by heating, sealing, and finally cutting the fabric in a linear process to form fused edges.

BACKGROUND OF THE INVENTION

Typically, a fabric or textile is a flexible woven material consisting of a network of artificial fibers. Fabrics have an assortment of uses, the most common of which are for clothing and containers such as bags and baskets. In the household, fabrics are used in window blinds, carpeting, upholstered furnishings, towels, covering for tables, beds, and other flat surface.

Often, in preparing window blinds, the edges of a thermoplastic fabric along the longitudinal side edge portions must have an aesthetically pleasing appearance without unraveling of the fibers at the edges. Also, if continuous lengths of the fabric are cut transversely and parallel, the cut edges must have the same characteristics.

In many cases, for any type of fabric cutting method, the straight cut edge may not coincide exactly with a cutting line. All fabrics have natural variations as the individual fibers flex and they are not intended to align exactly with the edges. Consequently, as the fabric is cut, the fibers that orient perpendicular to the cut get cross cut cleanly, exposing the butt ends of the threads. However, the fibers that run parallel to the direction of the cut get ripped lengthwise through the thread, creating a frayed edge.

This problem often occurs with a straight knife type blade or rotary knife. A crush style cut that sheers the fabric by pinching it between two plates also results in frayed edges due to the ripped parallel fibers. In some instances, a certain method uses heat to cut the fabric, thereby solving one problem by marginally sealing the butt ends of the cross cut threads to prevent them from unraveling. However, the threads that are ripped lengthwise are still loose and will fray.

In yet another method, heat sealing the edge of the fabric after it is cut takes the edge of the fabric and presses and heats it to seal the edge. This heat sealing method melts and seals the edge with heat from a radio frequency or impulse sealers. This results in a seal that helps prevent both the cross cut and ripped threads and prevents fraying. However, because the fabric has already been cut, it is difficult to seal the very edge unless it is done with a wide seal, such as ¼" to ½". Those skilled in the art recognize that any seal narrower than ¼" cannot be done reliably because of the stretch and tolerances of the fabric.

For example, a 1/16" seal is not practical because the edge of the fabric wavers by more than 1/16". In many cases, the edge of the fabric for window blinds will be 8 feet long or more. This wide seal along the edge produces a dark band down each side of the shade and is not aesthetically pleasing.

Even though the above cited methods for cutting and sealing a fabric address some of the needs of the market, a method and apparatus for cutting and sealing a fabric to form at least one fused edge, including a left and right edge of a shade fabric is still desired.

SUMMARY OF THE INVENTION

This invention is directed to a method and apparatus for cutting and sealing a moving length of a fabric by heating, sealing, and finally cutting the fabric in a linear process to form an even, fused edge. In some embodiments, the fabric undergoes a sequence of manipulations efficacious for cutting and sealing the fabric to a desired pattern and edge width, such as a left and right edge. The method and apparatus help to eliminate frayed edges on the fabric by fusing the fibers prior to cutting.

Initially, a fabric passes through the apparatus in a predetermined pattern. The fabric may include, without limitation, polyvinyl chloride (PVC), fiberglass coated with PVC, thermoplastic olefin (TPO), a thermoplastic polymer sheet, a polymer coated tech sheet, a polymer grafted sheet, and polyester. The apparatus remains stationary, while the fabric is pulled through the various steps and manipulations. In one embodiment, the fabric is clamped by a moving bar that draws the fabric off a roll and across a table. From the table, the fabric may then pass through the apparatus. The pattern may produce myriad products, including, without limitation, window blinds, curtains, and garments.

In some embodiments, a section of the fabric passes under a heating portion, such as a nozzle that expels hot gas. However, the heating portion may include any device that directs heat onto a section of the fabric. Those skilled in the art, in light of the present teachings, will recognize that heating a fabric, such as a thermoplastic fabric, changes the properties of the fabric. The fabric becomes soft when heated, and can be cooled and reheated repetitively. The present invention may be utilized to heat a variety of fabrics.

In one embodiment of the present invention, the heated section of the fabric may then be sealed immediately after heating by passing under a sealing portion. The compressive force of the disc forms a seal on the fabric that helps fuse the fibers in the fabric. The disc rotates while the fabric passes under. The sealing portion may include, without limitation, a 2 millimeter to 10 millimeter wide disc edge that forms a 1 millimeter to 5 millimeter sealed edge. The disc edge may include a beveled or substantially flat edge, efficacious for pressing against the heated section of the fabric. In one alternative embodiment, the disc may be heated and work in conjunction with, or heat independently of the heating portion. The thickness of the fabric decreases after compression and sealing of the fabric in the sealed section, thereby forming a receptive surface for the next step of the method, cutting the fabric.

In all embodiments of the present invention, the fabric immediately passes through a cutting portion after being sealed by the sealing portion. Those skilled in the art, in light of the present teachings, will recognize that the linear and immediate/concurrent cutting of the seal is what allows the small tolerances and narrow sealed edge. The cutting portion may include, without limitation, a sharp edge, a circular blade, a rotary knife, a razor, or an ultrasonic cutter. However, in other embodiments, the cutting portion may utilize heated cutting. The cutting process results in at least two formed edges of the fabric. The prior step of sealing the fabric configures the fibers in the fabric to remain fused, even after cutting. Those skilled in the art will recognize that the fabric comprises a cross section of fibers, some oriented perpendicular to the cut, and some oriented parallel to the cut. The parallel fibers have a proclivity to fray after cutting. The heating and sealing steps help minimize this fraying by fusing both the parallel and the perpendicular fibers into a single orientation. Consequently, the cutting step results in a smooth, fused edge after cutting. In one embodiment, the cutting portion slits a 2 millimeter sealed section of the fabric in half lengthwise, resulting in two 1 millimeter wide sealed fray-free edges.

A first aspect of the present invention provides a method for cutting and sealing comprising:
pulling the fabric in a predetermined pattern;
directing heat on a section of the fabric;
compressing and sealing a heated section of the fabric, wherein a substantially perpendicular fiber and a substantially parallel fiber of the heated section at least partially fuse;
cutting a sealed section of the fabric; and
forming at least one fused edge.

In a second aspect, the fabric passes through a linear, sequential series of steps comprising of heating, sealing, and cutting.

In another aspect, the heating comprises directing hot gas on a section of the fabric.

In yet another aspect, the sealing step comprises compressing a heated section of the fabric with a disc edge having a width between 2 millimeters to 10 millimeters.

In yet another aspect, a plurality of fibers in the fabric having a perpendicular orientation and a parallel orientation in relation to a fabric edge fuse after being heated and sealed.

In yet another aspect, the cutting step comprises a rotary knife that slits a 2 millimeter sealed section in half lengthwise, resulting in a 1 millimeter wide fused, fray-free edge.

In another aspect, in operation, the fabric moves through the apparatus, while the apparatus remains stationary. In some embodiments, a nozzle positions in proximity to the fabric. The nozzle directs a hot gas onto a section of the fabric desired for cutting. A next step may include sealing the heated section of the fabric with a disc edge, which rotates. The disc edge may comprise a width between 2 millimeters and 10 millimeters. The resultant sealed section of the fabric serves to fuse the fibers and decrease the thickness of the fabric. A next step includes immediately cutting the sealed section with ultrasonic cutter, a rotary blade, or any blade or cutter. Since the fibers have been fused prior to cutting, the resultant edges are smooth and have no frayed fibers, whereby no separate fibers can fray.

One benefit of the apparatus and method for cutting and sealing is that the edges are sufficiently smooth to be marketable as window blinds. This results in a more aesthetically pleasing edge because of the thin sealed edge that is barely visible. Conversely, a larger seal formed by the prior art creates a dark band along each edge that is clearly visible These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
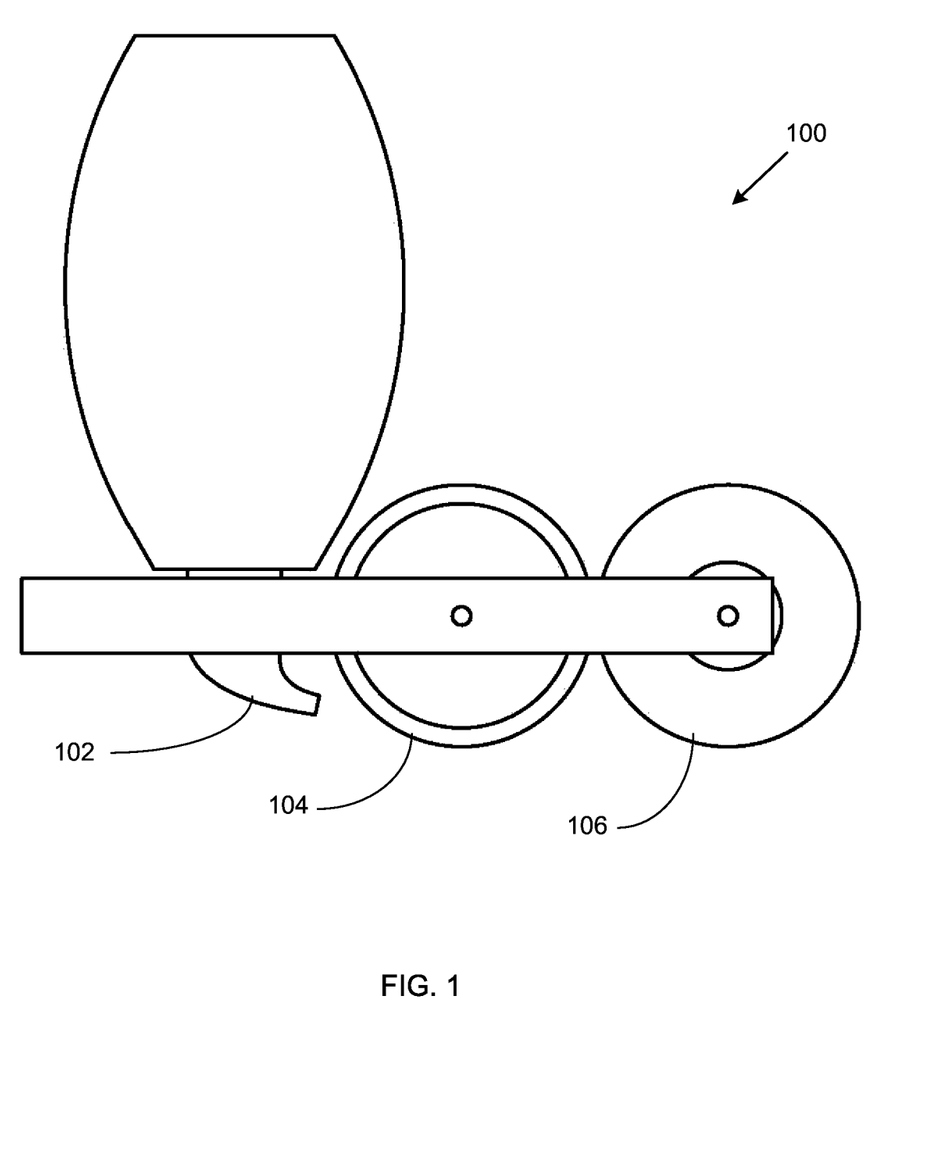
FIG. 1 illustrates a detailed perspective view of an exemplary heating portion, an exemplary sealing portion, and an exemplary cutting portion, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A method 500 for cutting and sealing a fabric 206 is described in FIGS. 1 through 5. The method includes a linear process of cutting and sealing a moving length of a fabric 206 by heating 204, sealing, and finally cutting fabric 206 with an apparatus 100 configured to heat, cut, and seal fabric 206. The resultant is a newly formed left and right sealed edge of the fabric 206. In some embodiments, fabric 206 undergoes a sequence of manipulations efficacious for cutting and sealing fabric 206 to a desired pattern and edge thickness, such as a left and right edge. The method and apparatus help to eliminate frayed edges on fabric 206 by fusing the fibers prior to cutting.

Figure 2:
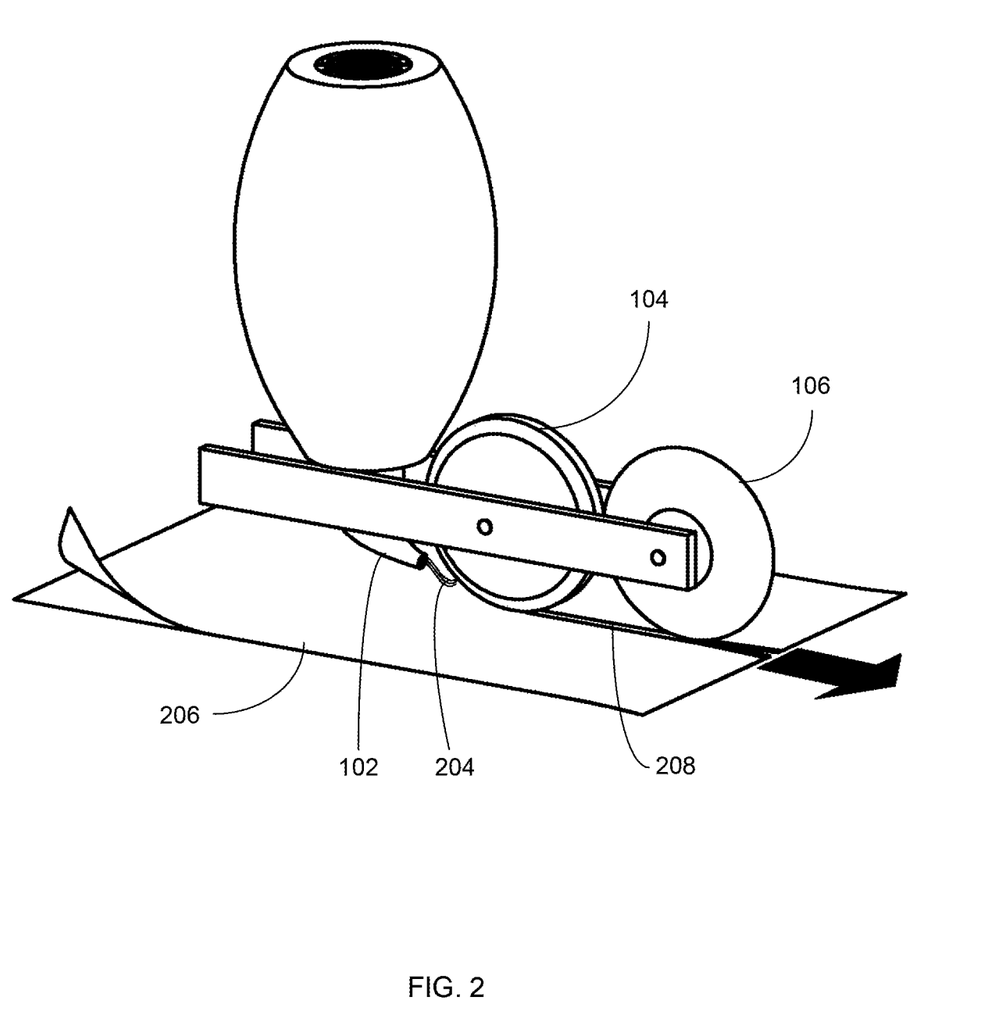
FIG. 2 illustrates a detailed perspective view of an exemplary heating portion, an exemplary sealing portion, and an exemplary cutting portion, engaging an exemplary fabric, in accordance with an embodiment of the present invention.

As referenced in FIG. 2, an initial step 502 comprises pulling fabric 206 through apparatus 100 in a predetermined pattern. Fabric 206 passes through apparatus 100 in a predetermined pattern, often configured to form a window scroll or blind. Apparatus 100 remains stationary, while fabric 206 is pulled through the various steps and manipulations. In one embodiment, fabric 206 is clamped by a moving bar that draws fabric 206 off a roll and across a table. From the table, fabric 206 may then pass through apparatus 100. The pattern may produce myriad products, including, without limitation, window blinds, curtains, and garments. Fabric 206 may include, without limitation, polyvinyl chloride (PVC), thermoplastic olefin (TPO), a thermoplastic polymer sheet, a polymer coated tech sheet, a polymer grafted sheet, and polyester.

A second step 504 comprises directing heat 204 towards a section of fabric 206. The section of fabric 206 passes under a heating portion 102, such as a nozzle that expels hot gas or a heated disc edge. However, heating portion 102 may include any device that directs heat 204 onto a section of fabric 206. Those skilled in the art, in light of the present teachings, will recognize that heating fabric 206, such as a thermoplastic fabric 206, changes the properties of fabric 206. Fabric 206 becomes soft when heated, and can be cooled and reheated repetitively. The present invention may be utilized to heat a variety of fabrics 206.

A Step 506 includes sealing a heated section of fabric 206. The heated section of fabric 206 may then be sealed immediately after heating by passing under a sealing portion 104. The compressive force of the disc forms seal 208 on the fabric 206 that helps fuse the fibers in the fabric 206. The disc rotates while fabric 206 passes under. Sealing portion 104 may include, without limitation, a 2 millimeter to 10 millimeter wide disc edge that forms two 1 millimeter to 5 millimeter sealed edges. The disc edge may include a beveled or substantially flat edge, efficacious for pressing against the heated section of fabric 206. In one alternative embodiment, the disc may heat 204 and work in conjunction with, or heat 204 independently of heating portion 102. The thickness of fabric 206 decreases after compression and sealing of seal 208, thereby forming a receptive surface for the next step of the method, cutting seal 208 in fabric 206. In yet a further embodiment, sealing portion 104 may include, without limitation, a flat bar, a sphere, a ruler, and a cubicle shaped weight press.

A Step 508 includes cutting seal 208 in fabric 206. Seal 208 immediately passes through a cutting portion 106 after being sealed by the sealing portion 104. Those skilled in the art, in light of the present teachings, will recognize that the linear and immediate/concurrent cutting of seal 208 is what allows the small tolerances and narrow sealed edge. Cutting portion 106 may include, without limitation, an ultrasonic cutter, a rotary cutter, a sharp edge, a circular blade, a rotary knife, and a razor.

Figure 3:
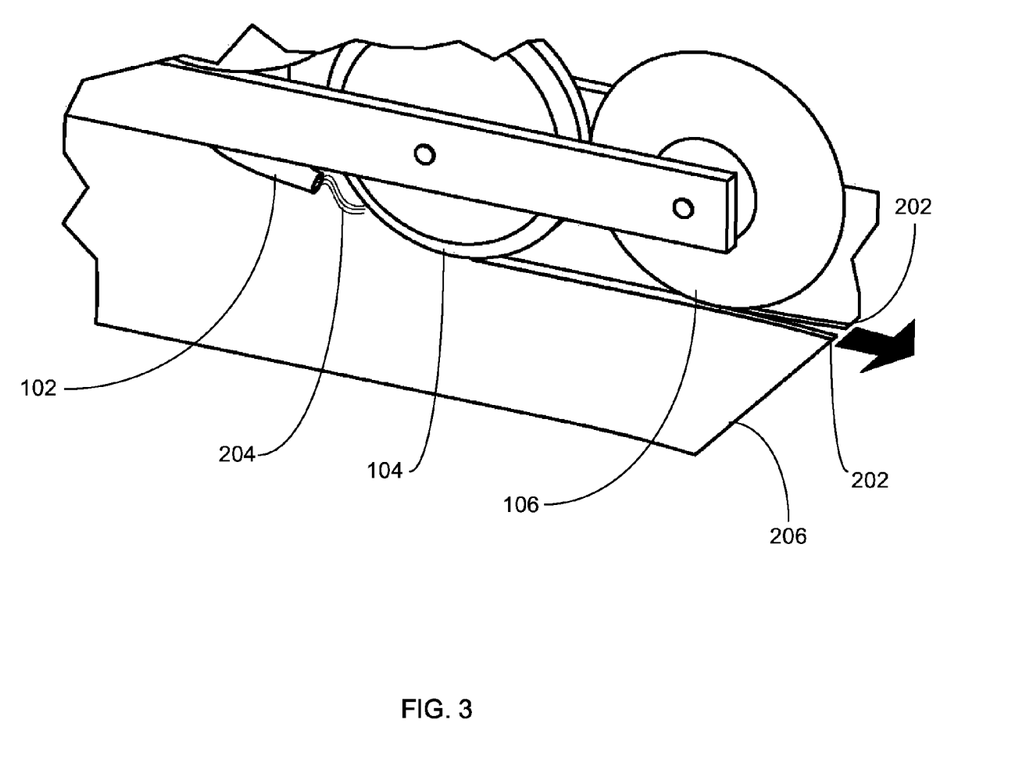
FIG. 3 illustrates a blow up view of an exemplary heating portion, an exemplary sealing portion, and an exemplary cutting portion, engaging an exemplary fabric, in accordance with an embodiment of the present invention.

However, in other embodiments, cutting portion 106 may be heated, for example, a heated disc that simultaneously seals and heats fabric 206, as referenced in FIG. 3. In some embodiments, the cutting process results in at least two formed edges of fabric 206. The prior step of creating seal 208 configures the fibers in fabric 206 to remain fused, even after cutting. In one embodiment, cutting portion 106 slits a 2 millimeter sealed section of the fabric 206 in half lengthwise, resulting in two 1 millimeter thick sealed fray-free edges.

A Step 510 comprises forming at least one fused edge 202 on fabric 206. Cutting portion 106 may form a left edge and a right edge, both resulting in smooth, fused edges 202. Those skilled in the art will recognize that fabric 206 comprises a cross section of fibers, some oriented perpendicular to the cut, and some oriented parallel to the cut. The parallel fibers have a proclivity to fray after cutting. The heating and sealing steps help minimize this fraying by fusing both the parallel and the perpendicular fibers into a single orientation. Consequently, the cutting step results in a smooth, fused edge 202 after cutting.

Figure 4:
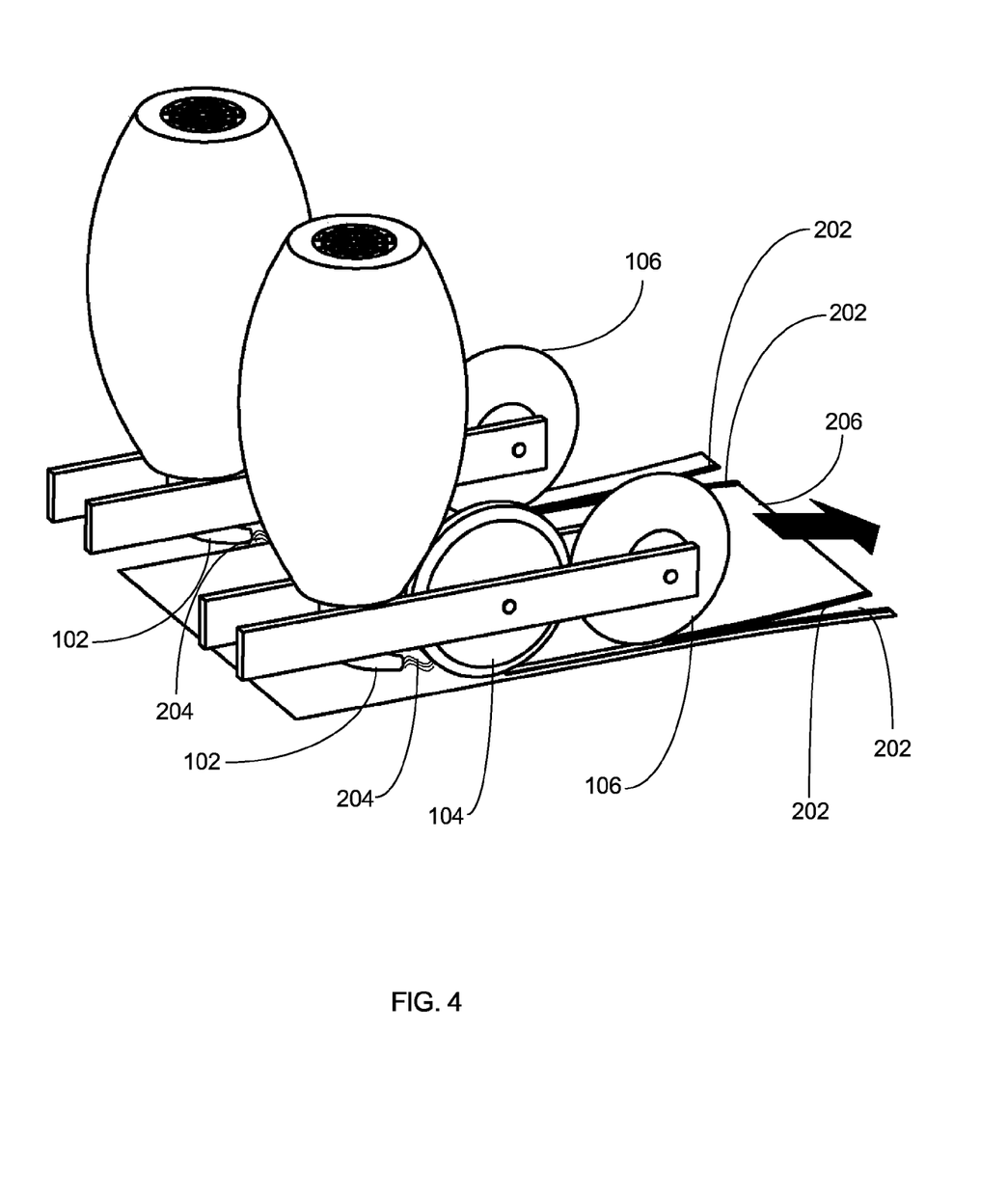
FIG. 4 illustrates a detailed perspective view of an exemplary plurality of heating portions, an exemplary plurality of sealing portions, and an exemplary plurality of cutting portions, engaging an exemplary fabric, in accordance with an embodiment of the present invention.

For example, without limitation, FIG. 4 depicts how every cut from cutting portion 106 produces two sealed edges at same time. However, in some embodiments, if two cutting portions 106 are simultaneously utilized, one shade can be made, as fabric 206 positions between the two cutting portions 106. The cutting portion 106 may form an out-cut piece, such as a scrap piece of fabric 206, to the left of a first cutting portion 106, and a second out-cut to the right of a second cutting portion 106. In yet another embodiment, if three cutting portions 106 are used, the out-cut positions to left of the first cutting portion 106, a shade 1 is formed between the first cutting portion 106 and the second cutting portion 106, a shade 2 is formed between the second cutting portion 106 and a third cutting portion 106 and an out-cut positions to the right of the third cutting portion 106. Those skilled in the art, in light of the present teachings, will recognize that myriad combinations of cutting patterns and number of cutting portions 106 are possible with the present invention.

Figure 5:
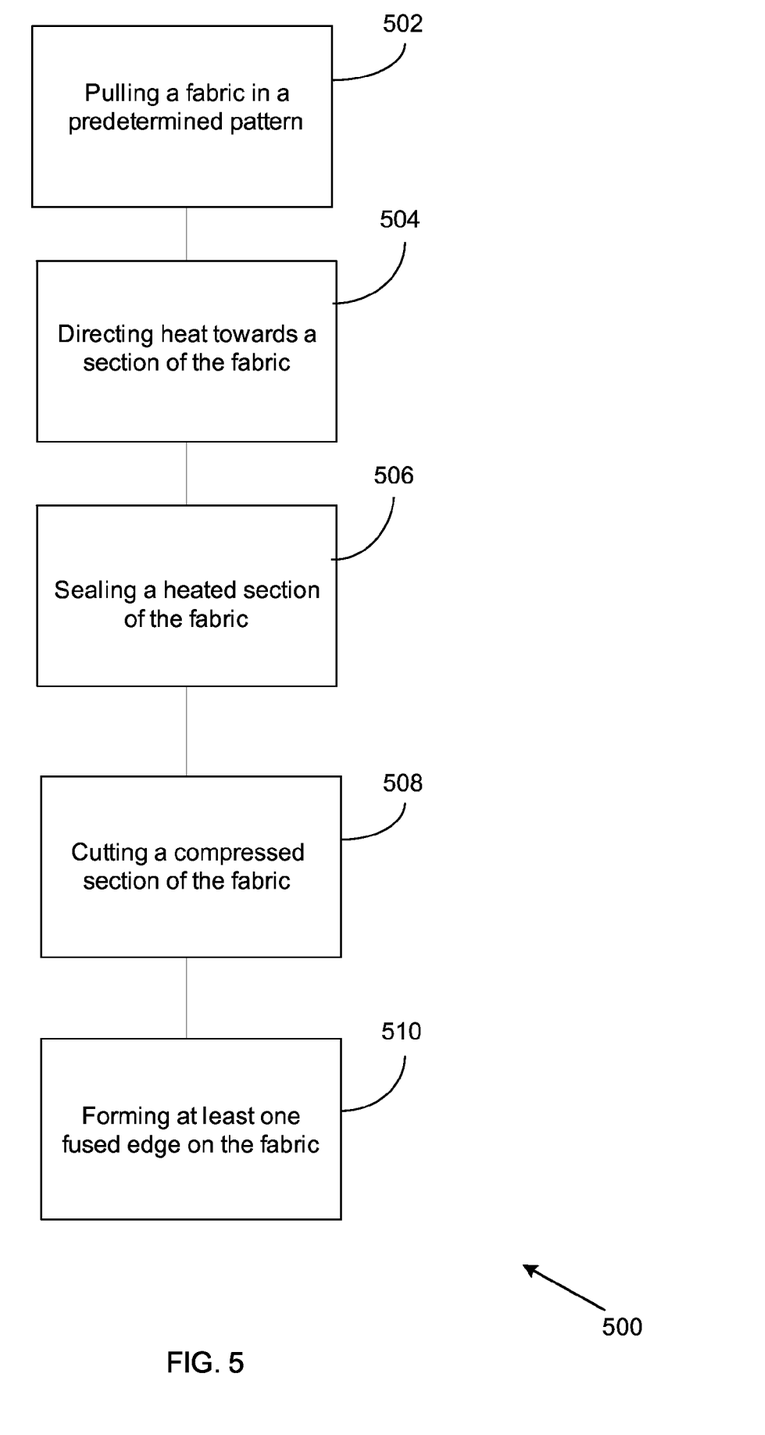
FIG. 5 illustrates a flowchart diagram of an exemplary method for cutting and sealing, in accordance with an embodiment of the present invention.

The method and apparatus for cutting and sealing a moving length of fabric 206 is designed to heat, seal, and finally cut fabric 206 in a linear process to form even, left and right side fused edges 202. Details of the method of cutting and sealing fabric 206 are illustrated in FIG. 5. In operation, the fabric 206 moves through the apparatus 100, while the apparatus 100 remains stationary. In some embodiments, a nozzle positions in proximity to fabric 206. The nozzle directs a hot gas onto a section of fabric 206 desired for cutting. A next step may include sealing heated 204 section of the fabric 206 with a disc edge, which rotates. The disc edge may comprise a width between 2 millimeters and 10 millimeters. The resultant seal 208 serves to fuse the fibers and decrease the thickness of fabric 206. A next step includes immediately cutting the sealed section with an ultrasonic cutter, rotary blade, or any blade or cutter. Since the fibers have been fused prior to cutting, the resultant edges are smooth and have no frayed fibers, whereby no separate fibers can fray.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. A method for cutting and sealing a fabric to form at least one fused edge, the method comprising:
    directing heat on a section of the fabric whereby the fabric becomes soft, and can be cooled and reheated repetitively without causing fusing between fibers of the fabric;
    compressing a heated section of the fabric,
    wherein a substantial number of fibers of the heated section at least partially fuse;
    cutting the fused section of the fabric;
    wherein the step of compressing the heated section of the fabric comprises compressing the heated section with a disc edge, the disc edge comprising a substantially flat edge having a width between 2 millimeters to 10 millimeters; and
    forming the at least one fused edge.

2. The method of claim 1, including the step of moving the fabric in a predetermined pattern.

3. The method of claim 1, wherein the fabric comprises a thermoplastic sheet.

4. The method of claim 1, wherein the heat comprises a hot gas.

5. The method of claim 1, wherein a heating portion comprises a heated disc edge.

6. The method of claim 1, wherein the heat is provided by directing a hot gas to the fabric and applying a heated disc edge to the fabric.

7. The method of claim 1, wherein the step of cutting the fused section of the fabric comprises cutting the fused section with a rotary cutter.

8. The method of claim 1, wherein the step of cutting the fused section of the fabric 2 comprises cutting the fused section with an ultrasonic cutter.

9. The method of claim 1, wherein the step of compressing the heated section of the fabric comprises compressing the heated section with a disc edge, the disc edge comprising a substantially flat edge having a width between 2 millimeters to 10 millimeters, the disc edge being heated.

10. An apparatus for cutting and sealing a fabric to form at least one fused edge, the apparatus comprising:
   a heated disc edge, the heated disc edge being configured to heat a section of a fabric to a temperature wherein the fabric becomes soft and fusible without causing fusing;
   a sealing portion, the sealing portion being configured to compress the heated section of the fabric, causing at least a substantial number of fibers of the heated section at least partially fuse;
   wherein the heated disc edge is the sealing portion;
   and a cutting portion, the cutting portion being configured to cut a sealed section of the fabric for forming at least one fused edge.

11. The apparatus of claim 10, wherein the heating portion comprises a nozzle, the nozzle being operable to expel a hot gas on the section of the fabric for creating a heated section of the fabric.

12. The apparatus in claim 10, comprising the heating portion, the heating portion being operable to expel a hot gas on the section of the fabric for creating a heated section of the fabric, and a heated disc edge.

13. The apparatus of claim 10, wherein the sealing portion comprises a disc edge for compressing the heated section of the fabric and forming the fused section of the fabric, the disc edge comprising a substantially flat edge having a width between 2 millimeters to 10 millimeters.

14. The apparatus of claim 10, wherein the cutting portion comprises a rotary cutting head.

15. The apparatus of claim 10, wherein the cutting portion comprises a rotary blade for cutting the fused section of the fabric, the rotary blade comprising a cutting edge having a width less than a disc edge.

16. The apparatus of claim 10, wherein the heating portion comprises of a plurality of heating portions, the sealing portion comprises of a plurality of sealing portions, and the cutting portion comprises of a plurality of cutting portions, each being configured to cut a plurality of fused sections of the fabric for forming a plurality of fused edges.

17. An apparatus for cutting and sealing a fabric to form at least one fused edge, the apparatus comprising:
   a heating portion, the heating portion being configured to heat a section of a fabric to a temperature wherein the fabric becomes soft and fusible without causing fusing;
   a sealing portion, the sealing portion being configured to compress the heated section of the fabric, said compression causing a substantial number of fibers of the heated section at least partially fuse;
   and a cutting portion, the cutting portion being configured to cut the fused section of the fabric for forming at least one fused edge;
   wherein said heating portion, said sealing portion and said cutting portion are connected in series to at least one horizontal support shaft such that the distance between said heating portion, said sealing portion and said cutting portion is not variable, and producing an equal amount of fused material on each side of the cut.

18. The method of claim 1, wherein the fused section is cut substantially in half.

* * * * *